United States Patent
Yager et al.

(10) Patent No.: US 9,512,013 B2
(45) Date of Patent: Dec. 6, 2016

(54) PIEZOELECTRIC DISCHARGE WATER PURIFICATION

(75) Inventors: Thomas A. Yager, Encinitas, CA (US); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 952 days.

(21) Appl. No.: 13/519,806

(22) PCT Filed: May 31, 2011

(86) PCT No.: PCT/US2011/038610
§ 371 (c)(1),
(2), (4) Date: Jun. 28, 2012

(87) PCT Pub. No.: WO2012/166121
PCT Pub. Date: Dec. 6, 2012

(65) Prior Publication Data
US 2013/0026108 A1    Jan. 31, 2013

(51) Int. Cl.
*C02F 1/72* (2006.01)
*C02F 1/36* (2006.01)
(Continued)

(52) U.S. Cl.
CPC .............. *C02F 1/36* (2013.01); *C02F 1/46114* (2013.01); *C02F 2101/30* (2013.01); *C02F 2305/023* (2013.01); *Y02W 10/37* (2015.05)

(58) Field of Classification Search
CPC ........... C02F 1/72; C02F 1/36; C02F 1/46114; C02F 2305/023; C02F 2101/30; Y02W 10/37
(Continued)

(56) References Cited

U.S. PATENT DOCUMENTS 3,376,438 A    4/1968   Colbert
5,225,089 A *  7/1993   Benes et al. ............. 210/748.05
(Continued)

FOREIGN PATENT DOCUMENTS

EP         979686 A2 *   2/2000
FR        2663648 A1    12/1991
WO     WO-98/58417     12/1998

OTHER PUBLICATIONS

Kuang-Sheng Hong, Huifang Xu, Hiromi Konishi, and Xiaochun Li, Direct Water Splitting Through Vibrating Piezoelectric Microfibers in Water, J. Phys. Chem. Letters, 2010, 1, p. 997-1002.*
(Continued)

*Primary Examiner* — Walter D Griffin
*Assistant Examiner* — Cameron J Allen
(74) *Attorney, Agent, or Firm* — Foley & Lardner LLP

(57) ABSTRACT

The fluid purification disclosed herein provides the advantages of high-voltage purification without electrocution risks. In illustrative purifiers, a contaminated fluid, such as contaminated water, is aerated and passed through a cavity that contains highly porous piezoelectric material and an ultrasonic transducer. The transducer emits ultrasonic energy that causes the piezoelectric material to discharge a high-voltage field, which produces strong oxidizing agents that kill organisms and oxidize organic pollutants. Since the ultrasonic actuator operates at relatively low voltages (e.g., 20-110 V) and can be electrically isolated from the fluid, illustrative purification is safe, environmentally friendly, and scalable from small to large size applications.

17 Claims, 5 Drawing Sheets

(51) Int. Cl.
*C02F 1/461* (2006.01)
*C02F 101/30* (2006.01)

(58) Field of Classification Search
USPC ............ 210/748.01, 600, 198, 243, 748.2,
748.3,210/748.04, 749, 253; 422/20, 22,
24, 198
See application file for complete search history.

(56) References Cited

U.S. PATENT DOCUMENTS

| | | | |
|---|---|---|---|
| 5,494,585 A * | 2/1996 | Cox | 210/748.11 |
| 5,519,670 A * | 5/1996 | Walter | 367/142 |
| 5,717,181 A * | 2/1998 | Colgate | 204/157.15 |
| 6,016,821 A | 1/2000 | Puskas | |
| 6,071,473 A | 6/2000 | Darwin | |
| 6,077,431 A * | 6/2000 | Kawanishi et al. | 210/609 |
| 6,111,339 A * | 8/2000 | Ohya et al. | 310/358 |
| 6,770,248 B2 * | 8/2004 | Haggett et al. | 422/128 |
| 6,780,306 B2 | 8/2004 | Schlager et al. | |
| 6,916,418 B2 | 7/2005 | Baldasarre et al. | |
| 7,671,516 B2 | 3/2010 | Adachi et al. | |
| 2003/0173307 A1* | 9/2003 | Carlson et al. | 210/748 |
| 2004/0129643 A1* | 7/2004 | Dubruque et al. | 210/748 |
| 2005/0006314 A1 | 1/2005 | Talukdar et al. | |
| 2005/0271559 A1* | 12/2005 | Ratcliff | 422/128 |
| 2007/0138108 A1* | 6/2007 | Hadfield et al. | 210/748 |
| 2008/0076954 A1 | 3/2008 | Suri et al. | |

OTHER PUBLICATIONS

International Search Report for PCT/US2011/038610 Mailed Aug. 19, 2011.
Written Opinion of the International Searching Authority for PCT/US2011/038610 mailed Aug. 19, 2011.
First Office Action and Search Report received in Chinese Appln. No. 201180070479.0 dated Oct. 15, 2014. (English Translation Not Available).
Malik et al., "Water purification by electrical discharges"—Plasma Sources Sci. Technol. 10 (2001) 82-91.
Mercadelli et al., "Porous Piezoelectric Ceramics", Book edited by: Ernesto Suaste-Gomez, ISBN: 978-953-307-122-0, Publisher: Sciyo, Publishing date: Oct. 2010 pp. 111-128.
Montanaro, L.; Jorand, Y.; Fantozzi G. & Negro, A. (1998). "Ceramic foams by powder processing", J. Eur. Ceram. Soc., (1998) 18, 1339-1350.
Shrout et al., "Lead-free piezoelectric ceramics: Alternatives for PZT?"—J Electroceram (2007) 19:111-124.

* cited by examiner

PIEZOELECTRIC DISCHARGE WATER PURIFICATION

CROSS-REFERENCE TO RELATED APPLICATION

This application is a U.S. national phase application under 35 U.S.C. §371 of PCT/US2011/038610, filed on May 31, 2011, which application is hereby incorporated herein by reference in its entirety.

BACKGROUND

Electrical discharges in aerated water produce $OH$, $H^+$, $O^-$, $O_3$, $H_2O_2$, which are among the strongest oxidizing agents. These species destroy bacteria and oxidize many harmful organic pollutants in water. There has been much interest in using electrical discharge to purify water since it is more environmentally friendly and more effective than purification with conventional oxidants and disinfectants. However, use of the high voltage required for electrical discharge in water is an electrocution hazard. It is also difficult to get uniform electrical discharge over a large volume of water. A safe and effective way to disinfect water is needed that takes advantage of electrical discharge purification.

SUMMARY

An exemplary fluid purifier includes a vessel that defines a cavity to hold contaminated fluid, such as contaminated water. The cavity also contains piezoelectric material and an ultrasonic transducer that applies ultrasonic energy to the piezoelectric material so as to cause the piezoelectric material to emit an electrical discharge (e.g., of 5 kV or more). The electrical discharge purifies the contaminated fluid in the cavity, e.g., by creating oxidizing species in the fluid that neutralize organic pollutants. An aerator may aerate the incoming fluid to provide additional oxygen for the oxidation reaction.

In some embodiments, the cavity is resonant at a frequency of the ultrasonic energy and has one or more interior surfaces that reflect at least a portion of the ultrasonic energy. The vessel defining the cavity can be formed at least in part of stainless steel, copper, nickel, and/or any other material that reflects ultrasonic energy and resists corrosion. Exemplary purifiers may also have an inlet to receive fluid into the cavity and an outlet to discharge purified fluid from the cavity. Optional filters disposed across the inlet and/or the outlet filter fluid received into and discharged from the cavity.

In illustrative purifiers, the piezoelectric material includes porous piezoelectric particles, each of which may have a diameter of about 1-10 mm, about 1-5 mm, or about 1-2.5 mm. Exemplary porous piezoelectric particles may have a pore size from about 0.1 μm to about 1 mm, about 1 μm to about 1 mm, or about 10 μm to about mm, and a porosity, which is the fraction of the (dry) porous piezoelectric material occupied by air (or gas), of up to at least about 70%, about 80%, about 85%, or about 90%. Exemplary piezoelectric material can include it lead-free material, such as a titanate containing potassium, sodium, and/or bismuth.

The ultrasonic transducer that applies ultrasonic energy to the piezoelectric material can be rectangular or disc-shaped and may be disposed along an inner surface of the cavity. Exemplary ultrasonic transducers may operate at a voltage of 20-1.10 V and emit at least one frequency component of about 20 kHz to about 1 MHz, about 25-500 kHz, or about 30-250 kHz. In some purifiers, the ultrasonic transducer can be driven by a waveform generator, which may be tuned to a resonant frequency of the cavity. The ultrasonic energy emitted by the ultrasonic transducer may cavitate the fluid in the cavity to provide additional mechanical energy to the piezoelectric particles.

In some embodiments of fluid purification, a sensor measures a purification (contamination) level of the fluid flowing. If the sensor indicates that fluid is not sufficiently purified, a controller coupled to the sensor actuates a valve that diverts water into a conduit, which circulates fluid through the cavity to achieve a desired purification level.

Further illustrative embodiments include kits for transforming lumens and/or cavities into fluid purifiers. Exemplary kits include piezoelectric material to be disposed within the lumen or cavity and an ultrasonic transducer to apply ultrasonic energy to the piezoelectric material so as to cause the piezoelectric material to emit an electrical discharge (e.g., of at least about 5 kV) that purifies fluid in the cavity (e.g., by producing oxidizing species that oxidize organic pollutants in the fluid). In exemplary kits, the transducer, which can be disc-shaped or rectangularly shaped, operates at a voltage of about 20 V to about 110 V.

The piezoelectric material may include lead-free porous piezoelectric particles, each of which can have a diameter of about 0.1-10 mm, about 1-5 mm, about 1-2.5 mm, or about 1.5 cm. Optimally, the polarization of the particles should exceed the dielectric strength of the water and be of a dimension smaller than the ultrasonic wavelength. Small particles may not have as much polarization, and larger particles may be too large to discharge. Exemplary porous piezoelectric particles may have a pore size from about 0.1 μm to about 1 mm, about 1 μm to about 1 mm, or about 10 μm to about 1 mm, and a porosity, which is the fraction of the (dry) porous piezoelectric material occupied by air (or gas), of up to at least about 70%, about 80%, about 85%, or about 90%.

Exemplary kits may also include a waveform generator to drive the ultrasonic transducer, which may be disposed along an inner surface of the cavity or lumen. The waveform generator can be tuned to find and to emit energy at the cavity or lumen's resonant frequency or frequencies, which may be about 20 kHz to about 1 MHz, about 25 kHz to about 500 kHz, or about 30 kHz to about 250 kHz.

Some kits may also include one or more filters or screens to filter fluid received into and/or discharged from the cavity or lumen. Kits may also include an optional aerator to aerate the fluid in the cavity.

The foregoing summary is illustrative only and is not intended to be in any way limiting. In addition to the illustrative aspects, embodiments, and features described above, further aspects, embodiments, and features will become apparent by reference to the following drawings and the detailed description.

DETAILED DESCRIPTION

Figure 1:
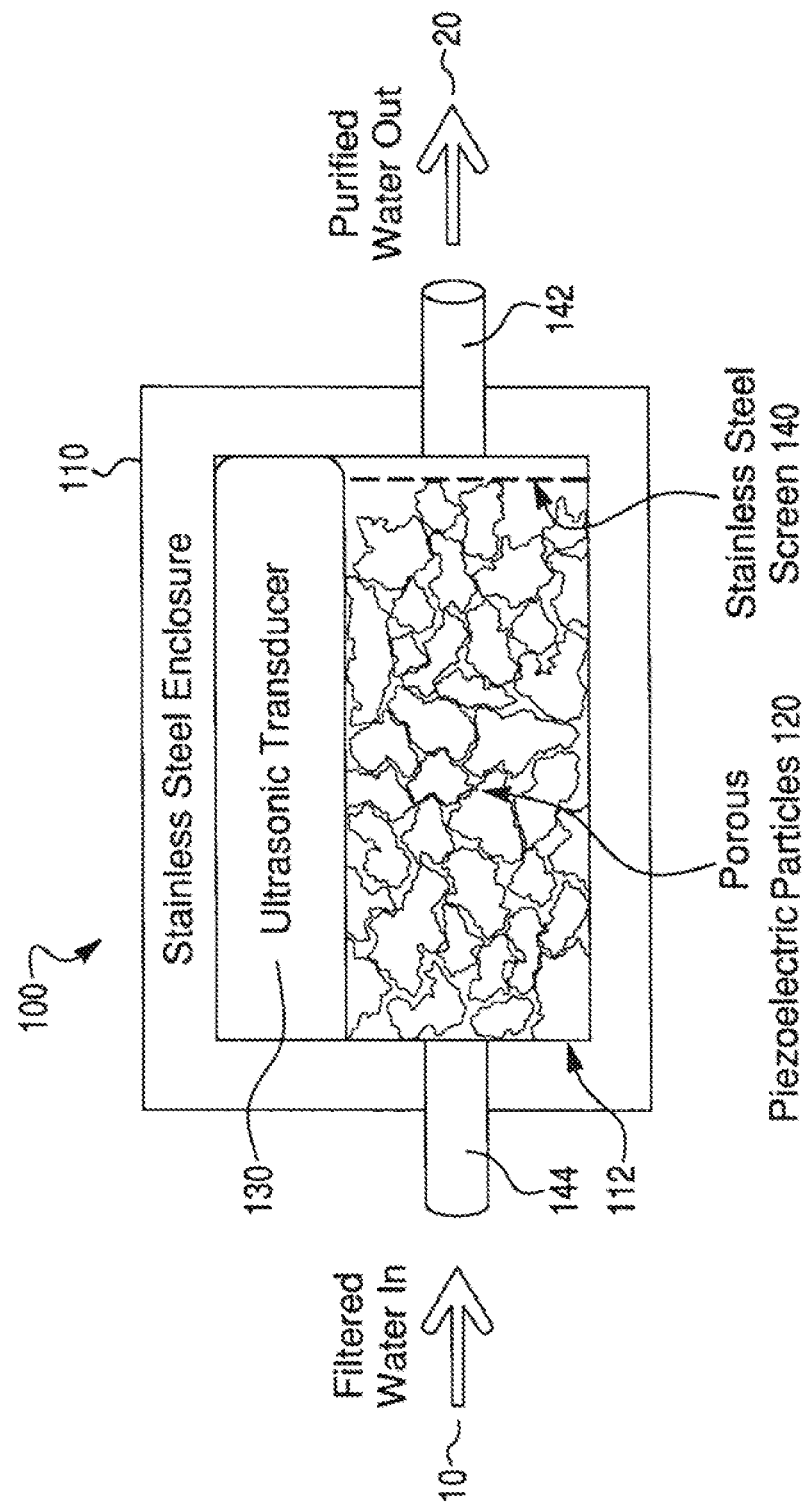
FIG. 1 is a block diagram of an illustrative embodiment of a fluid purifier of the present technology.

Illustrative embodiments include purifiers for and purification of contaminated water, aqueous solutions, and other fluids or liquids. In illustrative embodiments, a contaminated fluid is aerated and passed through a vessel that contain at least one highly porous piezoelectric material(s) and at least one ultrasonic actuator. Ultrasonic energy from the actuator induces a strong electric field within the particles that results in multiple high voltage electrical discharges (e.g., greater than about 5 kV). The electrical discharges in the aerated fluid produce strong oxidizing agents that damage or kill organisms and oxidize organic pollutants. Since the ultrasonic actuator operates at relatively low voltages (e.g., from about 20 V to about 110 V) and can be electrically isolated from the fluid, the techniques of the present technology are safe, environmentally friendly, and scalable from small to large size applications.

Operation of an illustrative piezoelectric purification cell involves activating the ultrasonic transducer in the cell at the appropriate frequency and flowing contaminated water or fluid through the cell. The fluid entering the cell may be filtered so that it is free of coarse particles that could clog the cell and optionally aerated so that dissolved oxygen is present in the fluid. The activated ultrasonic transducer produces compression waves within the cell that cause a large electric field and high voltage discharge both between and within the piezoelectric particles. The electric discharge in the presence of water and dissolved oxygen produces chemical agents, e.g., $OH^-$, $H^+$, $O^-$, $O_3$, and $H_2O_2$. These chemical agents are oxidizing species that purify the water and oxidizes organic pollutants. Without being bound by any particular theory, it is believed that the chemical agents (free radicals) engage in a first-order kinetic reaction with organic compounds in the contaminated fluid. After the organic compounds are deactivated, they may continue to oxidize by the chemical agent (free radicals). The chemical agents (free radicals) may also self-combine. As a result, the chemical agents can have very short lifetimes, e.g., on the order of seconds.

Exemplary piezoelectric fluid purifiers are particularly well suited to purifying aqueous solutions, such as water (even salt water) in places without (municipal) sources of clean drinking water. They can also be used to purify water from wells, lakes, streams, storage containers, etc. Exemplary piezoelectric fluid purifiers can also be used in remote locations provided there is a source of power for the ultrasonic transducer (e.g., batteries, solar cell, or generator). The piezoelectric water purification cells disclosed herein can be scaled from small to very large dimensions depending on the desired scale of application.

Advantages of the fluid purifiers and purification disclosed herein include all the benefits of high-voltage water purification without the hazard of electrocution. Fluid purifiers of the present technology provide significantly greater purification over ultrasonic cavitation-only purification at a lower energy consumption levels. The electric discharge from the stimulated piezoelectric material within each cell also provides a continuous cleaning action on the cell itself to reduce build-up of contamination.

In addition, the ultrasonically induced purifying electric discharge may be combined with cavitation induced by the ultrasonic transducer to further purify contaminated fluid (e.g., contaminated water) within an illustrative purification cell.

Fluid purification by the methods of the present technology provide environmentally friendly alternatives to purification with chemical oxidants, such as chlorine or iodine compounds. As a result, illustrative purification techniques of the present technology can be used to purify water without introducing a chemical taste.

FIG. 1 shows an exemplary piezoelectric fluid purification cell 100 that includes a vessel 110 fabricated from stainless steel, copper, nickel, and/or other material that reflects ultrasonic waves and resists corrosion and deterioration due to ultrasonic forces. The cavity 112 contains an ultrasonic transducer 130, which emits a compression or transverse continuous wave at is frequency from about 20 kHz to about 1 MHz. Other suitable operating ranges include 25-500 kHz, 25-250 kHz, and 30-100 kHz. Specific example frequencies include about 25 kHz, about 50 kHz, about 75 kHz, about 100 kHz, about 125 kHz, about 150 kHz, about 175 kHz, about 200 kHz, about 225 kHz, about 250 kHz, and ranges between any two of these values. The frequency of the transducer 130 can be matched to the cavity dimensions such that the height of the to transducer 130 from the bottom of the cavity 112 is a multiple of half the ultrasonic wavelength in the fluid being purified to within a certain tolerance, e.g., one-tenth of the wavelength in the fluid. In other words, the cavity 112, when filled with water or another fluid, resonates at the frequency of the ultrasonic energy emitted by the transducer 130. For example, if the ultrasonic frequency is 100 kHz, then the cavity height is an integer multiple of about 0.75 cm, which is half the wavelength, in water, corresponding to 100 kHz, to within a tolerance of ±0.15 cm.

The cavity 112 also contains at least one piezoelectric material—in this ease, porous piezoelectric particles 120—that respond to ultrasonic energy emitted by the transducer 130. (Alternatively, piezoelectric material can be non-porous.) The particles 120 are unconstrained within the cavity 112 (i.e., to the extent allowed by their size and the cavity walls). A screen 140 at a distal end of the cavity 112 prevents the particles 120 from being flushed out of the cavity with purified fluid 20. Pressure exerted by incoming fluid 10 prevents the particles 120 from exiting the cavity 112 via an inlet 144 at a proximal end of the vessel 110. The purifier 100 may include an optional screen (not shown) positioned at the inlet 144 to catch articles 120 flowing towards the inlet 144.

In operation, contaminated fluid 10, such as contaminated water, flows into the cavity 112 via the inlet 144. The transducer 130 emits ultrasonic energy that exerts a mechanical strain on the porous piezoelectric particles 120, which respond to the strain by emitting an electrical discharge (e.g., of about 5 kV or more) that produces chemical agents, such as oxidizing species, in the fluid 10. The electrical discharge is very quick, e.g., it can be a static discharge of 0.1 seconds or less, and its duration depends in part on the amount of charge separation and the conductivity of the breakdown channel. Dielectric breakdown of the fluid 10 limits the amplitude of the electrical discharge, which could exceed 3 MV/m. Any ultrasonic waves that are not coupled to the particles 120 scatter off the particles 120 and/or reflect off the interior walls of the cavity 112. Depending on the geometry, the scattered/reflected ultrasonic waves may add coherently to produce one or more resonant cavity modes that further stimulate the piezoelectric particles 120 until the ultrasonic energy is completely dissipated within the cavity 112 and/or absorbed by the porous piezoelectric particles 120. This further stimulation causes the particles 120 to emit more electrical discharges, which in turn yields larger quantities of the chemical agents.

The chemical agents may be or include oxidizing species that oxidize organic pollutants in the contaminated fluid 10. Exemplary oxidizing species include, but are not limited to, $OH^-$, $H^+$, $O^-$, $O_3$, and $H_2O_2$. This oxidation reactions transforms the contaminated fluid 10 into purified fluid 20, which flows out of the cavity 112 via an outlet 142 at the distal end of the cavity 112. Reaction rates may be very fast, e.g., $10^7$-$10^9$ $M^{-1}s^{-1}$ for $OH^-$. Any oxidizing species left after the purifying oxidation reaction decay within a few minutes. The reaction products are oxidation byproducts, which are less harmful than the precursor. However, these byproducts can remain dissolved in the water. Some byproducts will go off as carbon dioxide in a fashion similar to UV-ozone treatment of water. The screen 140, which may be a fine, stainless steel mesh, traps small particles in the purified fluid 20 as the purified fluid 20 flows toward the outlet 142. The discharged purified fluid 20 is suitable for other uses, e.g. drinking or bathing in cases where the purified fluid 20 is potable water.

The purification can be full or partial. The concentration of one or more organic pollutants in the contaminated fluid 10 can be higher than the concentration of the one or more organic pollutants in the purified fluid 20. The percent reduction in concentration can generally be any percent reduction. Specific examples include about 10%, about 20%, about 30%, about 40%, about 50%, about 60%, about 70%, about 80%, about 90%, about 95%, about 96%, about 97%, about 98%, about 99%, and ranges between any two of these values. In an ideal situation, the percent reduction is 100% (that is, the purified fluid does not contain a detectable level of the organic pollutant.

The ultrasonic energy emitted by the transducer 130 can also cavitate the fluid 10 transferring greater energy to the piezo-electric particles. In other words, the ultrasonic energy may cause vapor pockets to form and collapse quickly in regions of very low pressure within the fluid 10. In addition, ultrasonically induced cavitation can further purify the contaminated fluid, e.g., by damaging or killing microorganisms in the contaminated fluid.

Figure 2:
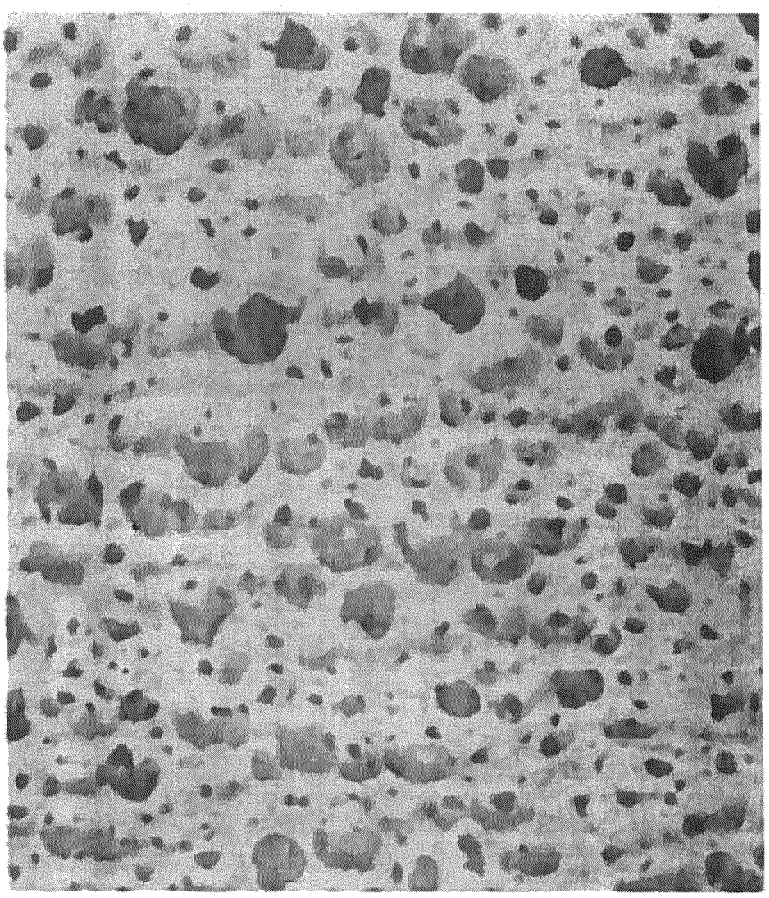
FIG. 2 is a photograph of highly porous lead zirconate titanate (PZT) material at 15× magnification.

FIG. 2 is a picture of lead zirconate titanate (PZT) piezoelectric material suitable for purifying certain fluids. The pores shown in FIG. 2 range in diameter from about 0.1 microns to over 20 microns. The PZT shown in FIG. 2 is formed by die pressing a fine particle size powder with glucide (a binder and teaming agent) and sintering the die-pressed material. After sintering, the ceramic material is broken up (e.g., lightly ground) to a particle size of 1-10 mm, 1-5 mm, or 1-2.5 mm to provide porous piezoelectric particles suitable for water purification in the purifier 100 of FIG. 1. Specific examples of particle size include about 1 mm, about 2 mm, about 3 mm, about 4 mm, about 5 mm, about 6 mm, about 7 mm, about 8 mm, about 9 mm, about 10 mm, and ranges between any two of these values. The broken-up material allows free motion of the particles, easy fluid flow, and better coupling to ultrasonic energy emitted by the ultrasonic transducer. Sintering produces a ceramic material with up to about 70%, 80%, 85%, or 90% porosity, which is the fraction of the ceramic material occupied by air (or gas) after sintering, and a controllable pore size from 0.1 μm to 1 mm, 1 μm to 1 mm, or 10 μm to 1 mm. The higher the porosity of the piezoelectric material, the larger the surface area available for purification.

Although PZT has the highest piezoelectric coefficient of useful piezoelectric materials, lead toxicity limits its usefulness for drinking water applications. Recently, lead-free piezoelectric materials (e.g., titanates containing potassium, sodium, and bismuth) have become commercially available. Exemplary lead-free materials include compositions in the $(Na, Bi)TiO_3$—$BaTiO_3$ and ternary system with $(K, Bi)TiO_3$, and the $(K, Na)NbO_3$ family. These lead-free materials have piezoelectric properties approaching those of PZT, but are not toxic, making them suitable for purifying water and other fluids.

Figure 3:
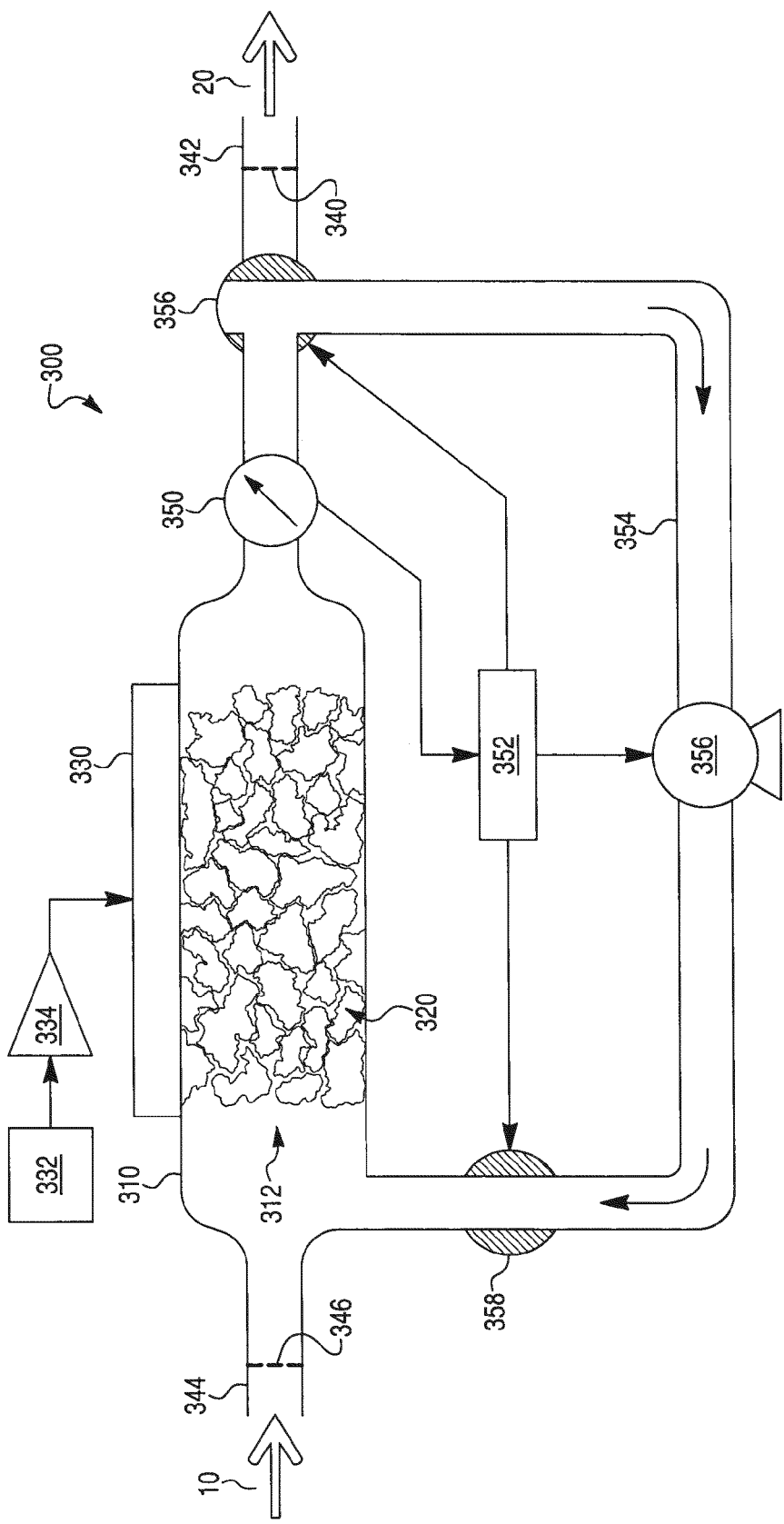
FIG. 3 is a block diagram of an illustrative embodiment of a fluid purifier of the present technology.

FIG. 3 illustrates an alternative fluid purifier 300 that includes it recycling line (conduit) 354 that re-circulates contaminated fluid 10, which, enters the purifier 300 via an inlet 344. A filter 346 disposed across the inlet 344 screens large particles in the contaminated fluid 10 from entering a cavity (lumen) 312 defined by a section of pipe 310. The contaminated fluid 10 flows through porous piezoelectric material 320 disposed within the cavity 312. In operation, an ultrasonic transducer 330, which is driven by an amplified signal from a programmable waveform generator 332 (e.g., a Tektronix AFG3000 series function generator) and amplifier 334 (e.g., an E&I 1020L amplifier), emits ultrasonic waves that stimulate electrical discharges from the porous piezoelectric material 320 as described with respect to FIG. 1.

Fluid pressure forces the contaminated fluid 10 through the activated piezoelectric material 320 to a sensor 350 (e.g., an InPro7005-VP sensor) disposed at a distal end of the cavity 312. The sensor 350 measures contamination (e.g., pathogen) levels in the fluid 10 and transmits an indication of the contamination levels to a controller 352. If the indication shows that contamination levels exceed predetermined contamination values, the controller 352 actuates a three-port valve 356 to re-direct the fluid 10 through to recycling line 354 (as shown). The controller 352 may also activate an optional pump 356 to circulate the fluid back into the cavity via a one-way, two-port valve 35, which is actuated by the controller 352. Alternatively, a three-port valve (not shown) may be used instead of or in addition to the two-port valve 358 to control the circulation of fluid 10 through the inlet 344 and the cavity 312. The re-circulated fluid 10 becomes further purified as it flows through the ultrasonically stimulated porous piezoelectric material 320.

The fluid 10 continues to flow through the cavity 312 via the recycling line 354 until the sensor 350 indicates that the contamination levels have dropped below the predetermined contamination values. The controller 352 responds to an indication of acceptable contamination levels by actuating the valves 356 and 358 and by turning off the pump 356) to allow purified fluid 20 to exit the purifier 300 through an outlet 342. A screen 340 filters large particles, such as particles of piezoelectric material 320, from the discharged fluid 20. Screens can be specified at various sizes, so long as the screen size is smaller than the particle size. Since granular materials typically have a particle size distribution, a set amount of water should be run through the system to flush out the small particles, e.g., about ten times the volume of the cell of flushing water.

In some cases, adjusting the amplitude, frequency, and timing (phase) of the ultrasonic waveform emitted by the transducer 330 increases the efficiency and/or speed with which the purifier eliminates pollutants from the contaminated fluid 10. As understood by those of ordinary skill in the art, the ultrasonic waveform can be manipulated by appropriately (re-)programming the programmable waveform generator 332 that drives the transducer 330. For example, the programmable waveform generator 332 can be programmed to emit: a continuous-wave signal at a single frequency (e.g., 100 kHz), otherwise known as a tone, that resonates within the cavity 312; a combination of tones (e.g., 25 kHz and 100 kHz) that resonate within the cavity 312; a pulsed signal, such as a resonant tone that turns on and off; a signal that increases and/or decreases in frequency, e.g., 25-100 kHz, otherwise known as a chirped signal; or any combination of the aforementioned signal types. The programmable waveform generator 332 can also be used to vary the amplitude of the ultrasonic waveform emitted by the ultrasonic transducer 330. The optimum ultrasonic waveform can be determined experimentally and may depend on the density of piezoelectric particles 120 in the fluid 10, the ultrasonic energy, and the fluid flow rate.

Figure 4:
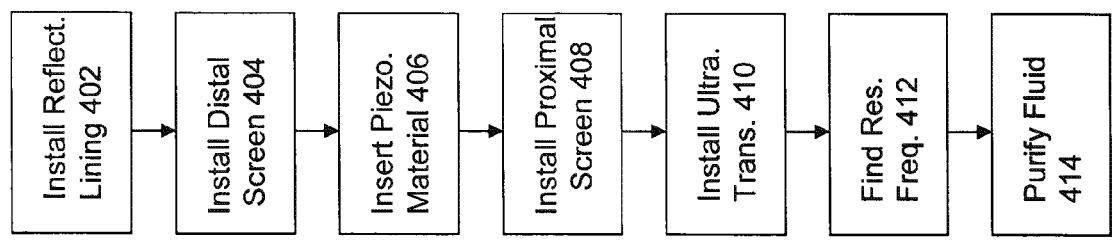
FIG. 4 is a flow diagram illustrating how to install an exemplary fluid purification kit of the present technology.

FIG. 4 is a flowchart that illustrates retrofitting a section of municipal water pipe or other fluid-carrying lumen to perform piezoelectric purification according to the examples given above. If necessary, the interior of the pipe section is lined (402) with copper, nickel, stainless steel, or another material that reflects ultrasonic energy and does not corrode. Next, a mesh screen or other filter is installed at a distal end of the section of pipe (404). Porous piezoelectric material is loaded into the pipe section on the proximal side of the mesh screen (406). An ultrasonic transducer is installed opposite the (optional) lining along a length of the pipe section (408). In some cases, the transduce is placed within the lumen defined by the pipe section in other cases, the transducer is disposed along the exterior of the pipe section. Another (optional) screen or filter may be installed across the proximal end of the pipe section to remove debris from the water (or other fluid) entering the pipe section. The optimum drive waveform is determined experimentally, e.g. by measuring the pipe section's resonance frequency and/or by measuring pathogen levels in water exiting the pipe section.

Figure 5:
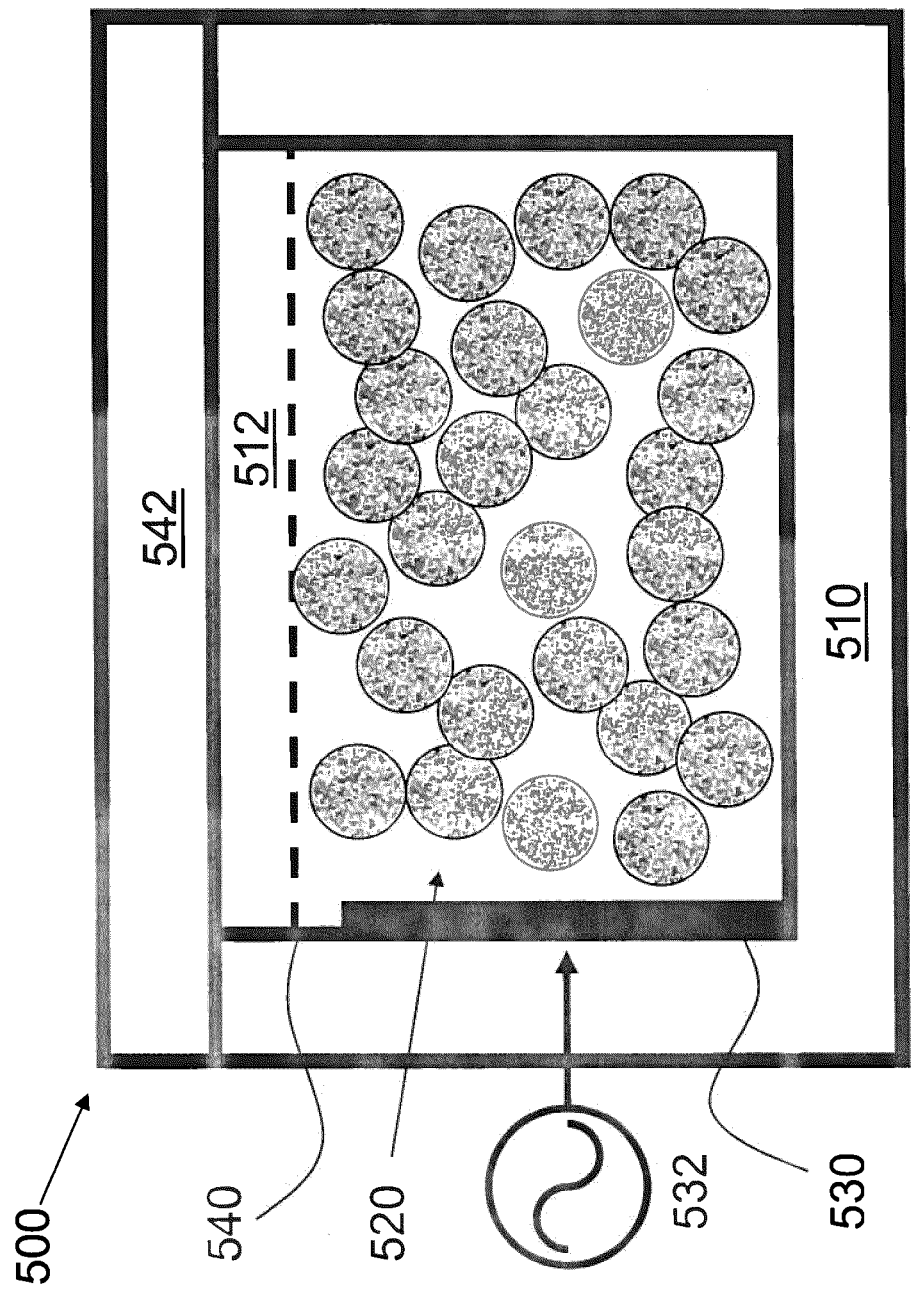
FIG. 5 is a block diagram of an illustrative embodiment of a portable fluid purifier of the present technology.

FIG. 5 shows an illustrative embodiment 500 of a portable purifier suitable for camping, disaster relief, temporary events (e.g., concerts), etc. To use the purifier 500, one fills a cavity 512 formed by container 510 with suspect or contaminated fluid, such as brackish water. A screen 540 placed across the top of the cavity 512 prevents large particles, such as rocks or pieces of soil, from entering the cavity 512. One seals the cavity with a lid 542, then activates a waveform generator 532 coupled to an ultrasonic transducer 530 arrayed along one edge of the cavity 512. Radiofrequency energy from the waveform generator 532, which can be powered by a battery or portable generator, drives the transducer 530 to emit ultrasonic energy that resonates within the cavity 512. The resonant ultrasonic energy exerts it mechanical strain on porous piezoelectric material 520 within the cavity 512 and cavitates (aerates) the fluid. The porous piezoelectric material 520 responds to the mechanical strain by emitting an electrical discharge of at least about 5 kV. The electrical discharge may create oxidizing species in the fluid including, but are not limited to, $OH$, $H^+$, $O^-$, $O_3$, and $H_2O_2$ that oxidize organic pollutants in the fluid. Once purification is complete, one de-activates the waveform generator 532, removes the lid 542, and pours the purified liquid out of the container 510 through the screen 540, which keeps the porous piezoelectric material 520 within die cavity 512.

EXAMPLE 1

Piezoelectric Purification of Municipal Water

A large reservoir holds billions of gallons of water for a city of about 500,000 people. The local water and sewer authority delivers about 45 million of gallons of water per day from the reservoir to the city via a 64-inch conduit. The conduit splits into smaller pipes, each of which connects to a water main in the city. Each of the smaller pipes includes a section lined with an ultrasonic transducer and filled with porous piezoelectric material. Screens at either end of the pipe section hold the porous piezoelectric material in the pipe section. The transducer, which is driven with a continuously applied, 110 VAC signal at a frequency that resonates in the pipe section, stimulates a high-voltage electrical discharge from the porous piezoelectric material that purifies the water flowing through the pipe section. The pipes convey the purified water to homes and businesses in the city via water mains and smaller pipes.

EXAMPLE 2

Piezoelectric Water Purification for Disaster Relief

A natural disaster, such as an earthquake, hurricane, tornado, or tsunami, destroys a large part of a city's infrastructure, including the water treatment facility. Sewage and other contaminants pollute the local supply of drinking water. To prevent the spread of disease through the contaminated drinking water, relief workers deploy portable, self-contained piezoelectric water purifiers in trucks and/or shipping containers delivered to the disaster area. An exemplary truck contains a cavity filled with porous piezoelectric material; an ultrasonic transducer lining the cavity; a pump to draw water into and force water through the cavity; and a power supply, such as a generator or battery, to power the pump and the ultrasonic transducer. To operate the purifier, a relief worker connects the pump to a water supply via a hose, then turns on the pump to fill the cavity with contaminated water. The transducer emits an ultrasonic wave that resonates within cavity. As described above, the piezoelectric material responds to ultrasonic stimulation by emitting a high-voltage discharge that purifies the water in the cavity. The purified, water is discharged through spigots or fixtures mounted on the side of the truck and collected for distribution to victims of the disaster.

EXAMPLE 3

Purification of Water-Contaminated with Benzene

In another example, an exemplary purifier is used to treat groundwater from a toxic waste site contaminated with benzene. A clean-up crew lines the toxic waste site with a nonporous material to prevent the groundwater from seeping, into drinking water supplies. Once the crew has finished isolating the waste site from its surroundings, it channels the groundwater into cistern. The crew then pumps the groundwater from the cistern into a portable piezoelectric purifier. An ultrasonic transducer in the purifier stimulates a high-voltage discharge from piezoelectric material in the purifier as the contaminated groundwater flows through the piezoelectric material. The high-voltage discharge produces chemical agents that oxidize the benzene in the groundwater, and the purified groundwater is discharged outside the toxic waste site. Analysis of the groundwater before and after purification using high-performance liquid chromatography or any other suitable analysis technique shows at least 80% reduction in the benzene concentration.

EXAMPLE 4

Multi-Stage Purification Device

Still other exemplary piezoelectric purifiers includes pipes divided into cascaded cavities, which may be identical or different, e.g., of differing diameter and/or length. Each cavity includes at least one ultrasonic transducer and at least one piezoelectric material. In some purifiers, each cavity holds identical piezoelectric material; in other purifiers, each cavity holds a different piezoelectric material, e.g., a material that is more porous, that includes finer particles, and/or that is composed of different substances. Likewise, each cavity can include an identical transducer, or the shape, number, and/or arrangement of ultrasonic transducers can vary from cavity to cavity. The transducers can be driven with identical waveforms or with different drive waveforms, e.g., pulsed waveforms whose repetition rate increases as a function of the cavity's position in the chain or cw waveforms whose frequency varies as a function of the cavity's position in the chain. Mesh screens separate successive cavities; each mesh can be finer than the preceding mesh in the chain. Water (or other liquid) flowing through the pipe undergoes high-voltage purification in each cavity in the pipe such that the water becomes purer as it flows from one cavity to the next. The number and/or operation of cavities can be determined based on the desired purity of the water. In some cases, the pipe may include valves and/or branches between adjacent cavities to discharge some liquid and/or to direct other liquid to the next cavity for further purification.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations run be expressly set forth herein for sake of clarity.

It will be understood by those within the art that, in general, terms used herein, and especially in the appended claims (e.g. bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim, includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations." without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together. A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:
1. A fluid purifier comprising:
 a vessel defining at least one cavity to hold fluid;
 an inlet to receive fluid into the at least one cavity;
 at least one piezoelectric material disposed within the cavity;

at least one ultrasonic transducer to apply ultrasonic energy to the piezoelectric material so as to cause the piezoelectric material to emit an electrical discharge that purifies the fluid, wherein the at least one cavity is resonant at a frequency of the ultrasonic energy; and an outlet to discharge purified fluid from the cavity, wherein the outlet is separate from the inlet.

2. The fluid purifier of claim 1, wherein an interior surface of the at least one cavity reflects at least a portion of the ultrasonic energy.

3. The fluid purifier of claim 1, further including a filter to filter fluid received into or discharged out of the at least one cavity.

4. The fluid purifier of claim 1, further including a meter to measure a purification level of the fluid.

5. The fluid purifier of claim 4, further including a conduit that circulates fluid through the at least one cavity to achieve a desired purification level.

6. The fluid purifier of claim 5, further including a valve configured to stop circulation of fluid through the at least one cavity.

7. The fluid purifier of claim 1, wherein each of the porous piezoelectric particles has a diameter of about 0.1 μm to about 10 mm.

8. The fluid purifier of claim 7, wherein the porous piezoelectric particles have a porosity of up to at least about 80%.

9. The fluid purifier of claim 1, wherein the at least one piezoelectric material is free of lead.

10. The fluid purifier of claim 1, further including an aerator configured to aerate the fluid in the cavity.

11. The fluid purifier of claim 1, wherein the at least one piezoelectric material is unconstrained within the at least one cavity.

12. The fluid purifier of claim 1, further comprising a screen positioned at a distal end of the at least one cavity, wherein the screen is configured to prevent the at least one piezoelectric material from being flushed out of the at least one cavity.

13. The fluid purifier of claim 1, wherein the at least one piezoelectric material is separate from the at least one ultrasonic transducer.

14. A fluid purifier comprising: a vessel defining at least one cavity to hold fluid;

an inlet to receive fluid into the at least one cavity;

at least one piezoelectric material disposed within the cavity, wherein the at least one piezoelectric material includes porous piezoelectric particles, at least one ultrasonic transducer to apply ultrasonic energy to the piezoelectric material so as to cause the piezoelectric material to emit an electrical discharge that purifies the fluid; and an outlet to discharge purified fluid from the cavity, wherein the outlet is separate from the inlet.

15. The fluid purifier of claim 14, wherein the porous piezoelectric particles are dispersed throughout the at least one cavity.

16. The fluid purifier of claim 14, wherein the porous piezoelectric particles are dispersed throughout the at least one cavity such that upon introduction of the fluid into the at least one cavity the fluid and the porous piezoelectric particles intermix.

17. A fluid purifier comprising:

a vessel defining at least one cavity to hold fluid;

an inlet to receive fluid into the at least one cavity;

at least one piezoelectric material disposed within the cavity;

at least one ultrasonic transducer to apply ultrasonic energy to the piezoelectric material so as to cause the piezoelectric material to emit an electrical discharge that purifies the fluid; and an outlet to discharge purified fluid from the cavity, wherein the outlet is separate from the inlet; and a waveform generator to drive the at least one ultrasonic transducer at a resonant frequency of the cavity.

* * * * *

UNITED STATES PATENT AND TRADEMARK OFFICE
CERTIFICATE OF CORRECTION

PATENT NO. : 9,512,013 B2  
APPLICATION NO. : 13/519806  
DATED : December 6, 2016  
INVENTOR(S) : Yager et al.

Page 1 of 2

It is certified that error appears in the above-identified patent and that said Letters Patent is hereby corrected as shown below:

In the Specification

In Column 1, Line 8, delete "§371" and insert -- § 371 --, therefor.

In Column 1, Line 57, delete "about mm," and insert -- about 1 mm, --, therefor.

In Column 1, Line 61, delete "include it" and insert -- include a --, therefor.

In Column 1, Line 67, delete "20-1.10 V" and insert -- 20-110 V --, therefor.

In Column 3, Line 10, delete "contain" and insert -- contains --, therefor.

In Column 3, Line 41, delete "deactivated," and insert -- de-activated, --, therefor.

In Column 4, Line 16, delete "at is" and insert -- at a --, therefor.

In Column 4, Line 24, delete "the to transducer 130" and insert -- the transducer 130 --, therefor.

In Column 4, Line 36, delete "ease," and insert -- case, --, therefor.

In Column 4, Line 47, delete "articles 120" and insert -- particles 120 --, therefor.

In Column 5, Line 23, delete "e.g. drinking" and insert -- e.g., drinking --, therefor.

In Column 5, Line 50, delete "teaming" and insert -- foaming --, therefor.

In Column 6, Line 13, delete "includes it" and insert -- includes a --, therefor.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,512,013 B2

In Column 6, Line 35, delete "through to" and insert -- through a --, therefor.

In Column 6, Line 38, delete "valve 35," and insert -- valve 358, --, therefor.

In Column 6, Line 50, delete "358 and" and insert -- 358 (and --, therefor.

In Column 7, Line 2, delete "continuous-wave signal" and insert -- continuous-wave (cw) signal --, therefor.

In Column 7, Line 13, delete "particles 120" and insert -- particles 320 --, therefor.

In Column 7, Line 26, delete "transduce" and insert -- transducer --, therefor.

In Column 7, Line 27, delete "section in" and insert -- section; in --, therefor.

In Column 7, Line 32, delete "e.g. by" and insert -- e.g., by --, therefor.

In Column 7, Line 49, delete "it mechanical" and insert -- a mechanical --, therefor.

In Column 7, Line 59, delete "die" and insert -- the --, therefor.

In Column 8, Line 42, delete "purified, water" and insert -- purified water --, therefor.

In Column 8, Line 49, delete "Water-Contaminated" and insert -- Water Contaminated --, therefor.

In Column 8, Lines 55-56, delete "seeping, into" and insert -- seeping into --, therefor.

In Column 9, Line 64, delete "run" and insert -- may --, therefor.

In Column 10, Line 1, delete "(e.g. bodies" and insert -- (e.g., bodies --, therefor.

In Column 10, Line 19, delete "claim, includes" and insert -- claim includes --, therefor.

In Column 10, Line 28, delete "recitations.”" and insert -- recitations," --, therefor.

In Column 10, Line 43, delete "together. A and C" and insert -- together, A and C --, therefor.